US008849996B2

United States Patent
Kaplan et al.

(10) Patent No.: US 8,849,996 B2
(45) Date of Patent: Sep. 30, 2014

(54) EFFICIENTLY PROVIDING MULTIPLE METADATA REPRESENTATIONS OF THE SAME TYPE

(75) Inventors: Jesse D. Kaplan, Sammamish, WA (US); Shawn Farkas, Kirkland, WA (US); Raja Krishnaswamy, Redmond, WA (US); Richard M. Byers, Waterloo (CA); Ryan A. Byington, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 326 days.

(21) Appl. No.: 13/350,604

(22) Filed: Jan. 13, 2012

(65) Prior Publication Data

US 2013/0067053 A1  Mar. 14, 2013

Related U.S. Application Data

(60) Provisional application No. 61/533,744, filed on Sep. 12, 2011.

(51) Int. Cl.
*G06F 15/16* (2006.01)
*G06F 17/30* (2006.01)

(52) U.S. Cl.
CPC ............... *G06F 17/30569* (2013.01)
USPC ........... 709/224; 709/214; 709/215; 709/216; 707/743; 707/756; 707/758

(58) Field of Classification Search
CPC ...................................... G06F 15/16
USPC ................... 709/226, 203; 707/661, 827
See application file for complete search history.

(56) References Cited

U.S. PATENT DOCUMENTS

| 5,181,225 | A | 1/1993 | Abraham | |
|---|---|---|---|---|
| 6,430,575 | B1 | 8/2002 | Dourish | |
| 6,523,046 | B2 | 2/2003 | Liu | |
| 6,594,653 | B2 * | 7/2003 | Colby et al. | 1/1 |
| 6,760,721 | B1 | 7/2004 | Chasen | |
| 7,069,270 | B1 | 6/2006 | Kumar | |

(Continued)

OTHER PUBLICATIONS http://www.nsa.gov/ia/_files/app/pdf_risks.pdf "Hidden Data and Metadata in Adobe PDF Files: Publication Risks and Countermeasures"—National Security Agency, Jul. 2008.*

(Continued)

*Primary Examiner* — Randy Scott
(74) *Attorney, Agent, or Firm* — Kevin Sullivan; Brian Haslam; Micky Minhas

(57) ABSTRACT

Embodiments are directed to dynamically adapting metadata for use with a native data encoding and to efficiently modifying object model type references. In one scenario, a computer system instantiates a metadata reader over an object model description to access various portions of metadata in the object model description. The metadata reader is configured to read native metadata, where native metadata is metadata represented in an encoding that is expected by the metadata reader. The metadata reader determines that the accessed metadata is encoded in a non-native encoding and then determines which metadata modifications are to be performed to transform the non-native encoding into a native encoding. The computer system then dynamically adapts the metadata of the object model from a non-native encoding to a native encoding according to the determined modifications. As such, the object model is readable by a native runtime.

11 Claims, 9 Drawing Sheets

(56) References Cited

U.S. PATENT DOCUMENTS

| | | |
|---|---|---|
| 7,197,158 B2 | 3/2007 | Camara |
| 7,209,571 B2 | 4/2007 | Davis |
| 7,234,104 B2 | 6/2007 | Chang |
| 7,243,207 B1 | 7/2007 | Prakash |
| 7,325,007 B2 * | 1/2008 | Castro et al. .......................... 1/1 |
| 8,195,760 B2 * | 6/2012 | Lacapra et al. ............... 709/214 |
| 2002/0001395 A1 | 1/2002 | Davis et al. |
| 2004/0133605 A1 | 7/2004 | Chang et al. |
| 2005/0180459 A1 | 8/2005 | Watson |
| 2005/0289133 A1 | 12/2005 | Arrouye |
| 2006/0053139 A1 | 3/2006 | Marzinski |
| 2006/0115108 A1 | 6/2006 | Rodriguez |
| 2006/0136472 A1 | 6/2006 | Jujjuri |
| 2006/0184554 A1 | 8/2006 | Albert |
| 2006/0184576 A1 | 8/2006 | Albert |
| 2007/0231781 A1 | 10/2007 | Zimmermann |
| 2008/0207182 A1 | 8/2008 | Maharajh et al. |
| 2008/0270382 A1 | 10/2008 | Thomsen et al. |
| 2009/0077097 A1 * | 3/2009 | Lacapra et al. ................. 707/10 |
| 2011/0208761 A1 | 8/2011 | Zybura et al. |
| 2011/0264495 A1 * | 10/2011 | Hailey et al. ................ 705/14.16 |
| 2011/0289094 A1 * | 11/2011 | Fisher ........................... 707/748 |

OTHER PUBLICATIONS

U.S. Appl. No. 61/533,744, filed Sep. 12, 2011, Kaplan.
U.S. Appl. No. 11/061,945, filed May 16, 2007, Office Action.
U.S. Appl. No. 11/061,945, filed Nov. 16, 2007, Office Action.
U.S. Appl. No. 11/061,945, filed Jul. 28, 2008, Office Action.
U.S. Appl. No. 11/061,945, filed Dec. 31, 2008, Office Action.
U.S. Appl. No. 11/061,945, filed Jun. 3, 2009, Office Action.
U.S. Appl. No. 11/062,267, filed Jul. 17, 2007, Office Action.
U.S. Appl. No. 11/062,267, filed Jan. 8, 2008, Office Action.
U.S. Appl. No. 11/062,267, filed Jun. 18, 2008, Office Action.
U.S. Appl. No. 11/062,267, filed Apr. 23, 2009, Office Action.
U.S. Appl. No. 11/061,945, filed Dec. 11, 2009, Office Action.

* cited by examiner

EFFICIENTLY PROVIDING MULTIPLE METADATA REPRESENTATIONS OF THE SAME TYPE

CROSS-REFERENCE TO RELATED APPLICATIONS

This application claims the benefit of and priority to U.S. Provisional Application No. 61/533,744, entitled "SYSTEM FOR HAVING MULTIPLE METADATA DEFINITIONS OF A SINGLE TYPE PARTITIONED TO APPROPRIATE CONSUMERS", filed on Sep. 12, 2011, which is incorporated by reference in its entirety herein.

BACKGROUND

Computers have become highly integrated in the workforce, in the home, in mobile devices, and many other places. Computers can process massive amounts of information quickly and efficiently. Software applications designed to run on computer systems allow users to perform a wide variety of functions including business applications, schoolwork, entertainment and more. Software applications are often designed to perform specific tasks, such as word processor applications for drafting documents, or email programs for sending, receiving and organizing email.

In some cases, software applications are designed to implement various forms of metadata. This metadata may be represented by different metadata types. The different types may be used for different users, based on which metadata type each user is expecting to see. In such situations, multiple different metadata files are typically stored and used to provide the various metadata types. Storing and implementing such an array of metadata files may lead to inefficiencies in retrieving and applying the correct metadata file.

BRIEF SUMMARY

Embodiments described herein are directed to dynamically adapting metadata for use with a native data encoding and to efficiently modifying object model type references. In one embodiment, a computer system instantiates a metadata reader over an object model description to access various portions of metadata in the object model description. The metadata reader is configured to read native metadata, where native metadata is metadata represented in an encoding that is expected by the metadata reader. The metadata reader determines that the accessed metadata is encoded in a non-native encoding and then determines which metadata modifications are to be performed to transform the non-native encoding into a native encoding. The computer system then dynamically adapts the metadata of the object model from a non-native encoding to a native encoding according to the determined modifications. As such, the object model is readable by a native runtime.

In another embodiment, a computer system instantiates a type reference table configured to receive type definition requests and provide appropriate type definitions in response. The type reference table includes metadata readable by a metadata reader. The instantiated type reference table receives a type definition request for a specified type from a type requester. The computer system implements type references in the type reference table to dynamically substitute various types for the metadata reader based on which type was requested and which type is appropriate for the current consumer of the metadata reader. The computer system then provides the requested type definition to the type requester based on the dynamically substituted types.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Additional features and advantages will be set forth in the description which follows, and in part will be apparent to one of ordinary skill in the art from the description, or may be learned by the practice of the teachings herein. Features and advantages of embodiments of the invention may be realized and obtained by means of the instruments and combinations particularly pointed out in the appended claims. Features of the embodiments of the present invention will become more fully apparent from the following description and appended claims, or may be learned by the practice of the invention as set forth hereinafter.

BRIEF DESCRIPTION OF THE DRAWINGS

To further clarify the above and other advantages and features of embodiments of the present invention, a more particular description of embodiments of the present invention will be rendered by reference to the appended drawings. It is appreciated that these drawings depict only typical embodiments of the invention and are therefore not to be considered limiting of its scope. The embodiments of the invention will be described and explained with additional specificity and detail through the use of the accompanying drawings in which.

DETAILED DESCRIPTION

Figure 1:
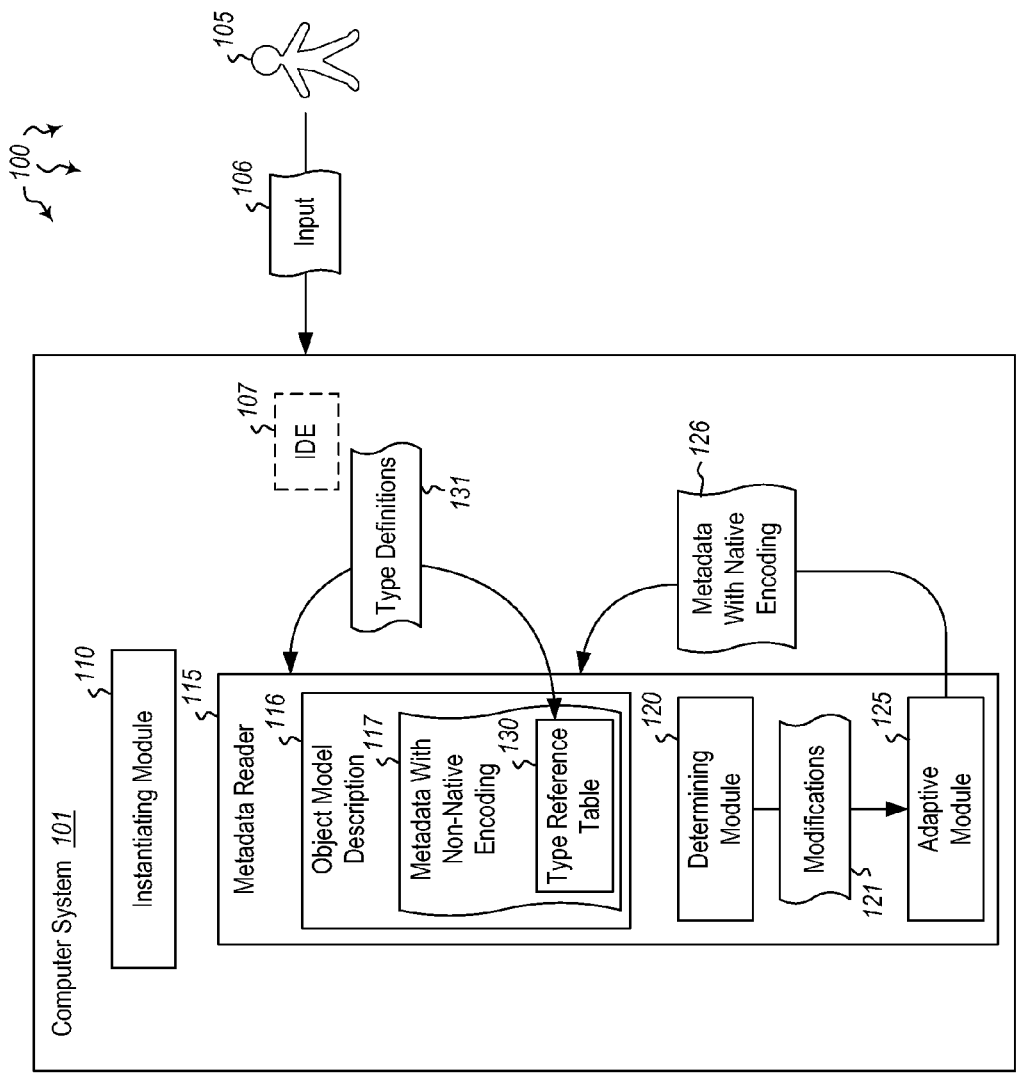
FIG. 1 illustrates a computer architecture in which embodiments of the present invention may operate including dynamically adapting metadata for use with a native data encoding and efficiently modifying object model type references.

Embodiments described herein are directed to dynamically adapting metadata for use with a native data encoding and to efficiently modifying object model type references. In one embodiment, a computer system instantiates a metadata reader over an object model description to access various portions of metadata in the object model description. The metadata reader is configured to read native metadata, where native metadata is metadata represented in an encoding that is expected by the metadata reader. The metadata reader determines that the accessed metadata is encoded in a non-native encoding and then determines which metadata modifications are to be performed to transform the non-native encoding into a native encoding. The computer system then dynamically adapts the metadata of the object model from a non-native encoding to a native encoding according to the determined modifications. As such, the object model is readable by a native runtime.

In another embodiment, a computer system instantiates a type reference table configured to receive type definition requests and provide appropriate type definitions in response. The type reference table includes metadata readable by a metadata reader. The instantiated type reference table receives a type definition request for a specified type from a type requester. The computer system implements type references in the type reference table to dynamically substitute various types for the metadata reader based on which type was requested and which type is appropriate for the current consumer of the metadata reader. The computer system then provides the requested type definition to the type requester based on the dynamically substituted types.

The following discussion now refers to a number of methods and method acts that may be performed. It should be noted, that although the method acts may be discussed in a certain order or illustrated in a flow chart as occurring in a particular order, no particular ordering is necessarily required unless specifically stated, or required because an act is dependent on another act being completed prior to the act being performed.

Embodiments of the present invention may comprise or utilize a special purpose or general-purpose computer including computer hardware, such as, for example, one or more processors and system memory, as discussed in greater detail below. Embodiments within the scope of the present invention also include physical and other computer-readable media for carrying or storing computer-executable instructions and/or data structures. Such computer-readable media can be any available media that can be accessed by a general purpose or special purpose computer system. Computer-readable media that store computer-executable instructions in the form of data are computer storage media. Computer-readable media that carry computer-executable instructions are transmission media. Thus, by way of example, and not limitation, embodiments of the invention can comprise at least two distinctly different kinds of computer-readable media: computer storage media and transmission media.

Computer storage media includes RAM, ROM, EEPROM, CD-ROM, solid state drives (SSDs) that are based on RAM, Flash memory, phase-change memory (PCM), or other types of memory, or other optical disk storage, magnetic disk storage or other magnetic storage devices, or any other medium which can be used to store desired program code means in the form of computer-executable instructions, data or data structures and which can be accessed by a general purpose or special purpose computer.

A "network" is defined as one or more data links and/or data switches that enable the transport of electronic data between computer systems and/or modules and/or other electronic devices. When information is transferred or provided over a network (either hardwired, wireless, or a combination of hardwired or wireless) to a computer, the computer properly views the connection as a transmission medium. Transmissions media can include a network which can be used to carry data or desired program code means in the form of computer-executable instructions or in the form of data structures and which can be accessed by a general purpose or special purpose computer. Combinations of the above should also be included within the scope of computer-readable media.

Further, upon reaching various computer system components, program code means in the form of computer-executable instructions or data structures can be transferred automatically from transmission media to computer storage media (or vice versa). For example, computer-executable instructions or data structures received over a network or data link can be buffered in RAM within a network interface module (e.g., a network interface card or "NIC"), and then eventually transferred to computer system RAM and/or to less volatile computer storage media at a computer system. Thus, it should be understood that computer storage media can be included in computer system components that also (or even primarily) utilize transmission media.

Computer-executable (or computer-interpretable) instructions comprise, for example, instructions which cause a general purpose computer, special purpose computer, or special purpose processing device to perform a certain function or group of functions. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the invention may be practiced in network computing environments with many types of computer system configurations, including personal computers, desktop computers, laptop computers, message processors, hand-held devices, multi-processor systems, microprocessor-based or programmable consumer electronics, network PCs, minicomputers, mainframe computers, mobile telephones, PDAs, pagers, routers, switches, and the like. The invention may also be practiced in distributed system environments where local and remote computer systems that are linked (either by hardwired data links, wireless data links, or by a combination of hardwired and wireless data links) through a network, each perform tasks (e.g. cloud computing, cloud services and the like). In a distributed system environment, program modules may be located in both local and remote memory storage devices.

FIG. 1 illustrates a computer architecture 100 in which the principles of the present invention may be employed. Computer architecture 100 includes computer system 101. Computer system 101 may be any type of local or distributed computer system including a cloud computing system. The computer system may include various different modules for performing a variety of different tasks. The computer system uses various different interfaces to allow user interaction with the system. In some embodiments, the computer system may provide an integrated development environment (IDE) 107 that allows a developer to develop a software program. Thus, in some cases, user 105 may be a developer, and may send input 106 to interact with the IDE. The IDE may provide access to a variety of different programming constructs and other elements. In some cases, this may include a metadata reader 115.

Some embodiments described herein provide a single metadata file that presents a different view of a single type to different metadata consumers. This different view may be presented without forcing the metadata reader 115 to make these changes on the fly as the metadata is being read. When a metadata reader is instantiated over an object model description 116, the reader may detect the encoding of the metadata and determine what modifications may be needed so that the metadata looks natural to the reader's consumers. The reader wraps the metadata in an adapter (e.g. adapting module 125) which modifies the encoding of the metadata such that consumers of the metadata reader can operate over the foreign (or "non-native" herein) encoding (e.g. 117) without modifications. Embodiments also describe an encoding of metadata to enable translation in an efficient manner. As used herein, a "native" encoding refers to a metadata encoding that is in the format expected by the metadata reader. A "non-native" or foreign encoding refers to any metadata encoding that is not expected by the metadata reader.

In cases where the modifications are substantial, multiple copies of the metadata may be created for a single type. Each of these copies includes distinguishing characteristics that make it possible for a metadata reader to determine which view is to be presented to which metadata consumer. Once that determination has been made, the determined view is provided to each consumer. Metadata consumers can pass an option to the reader identifying their preferred view type. The metadata reader can then use that to choose which of the view types to present. The remainder of the views are then hidden from that consumer.

Some embodiments described herein may include the following aspects: 1) automatic detection by a metadata reader of modifications necessary to adapt a foreign object model encoding to the native one, 2) modification of types referenced by an object model to instead be types from a different object model, 3) an encoding of metadata to allow efficient translation between type systems of two different object models, 4) modification of metadata encoding such that it conforms to the metadata encoding standards expected by consumers of a metadata reader, 5) enabling metadata consumers to transparently consume varied metadata encodings without modification and 6) a single metadata file that contains multiple views of a single entity for direct use by different consumers. The views are complete and consistent for each consumer and only the entities that need different views for each consumer have multiple views (i.e. this is not simply a zip file that contains three copies of a metadata file). Metadata consumers may thus easily specify which type of view they desire. The metadata reader may also be able to select a complete and consistent metadata view based on the consumer's selection.

When a metadata adapter 125 is instantiated over an object model description 116, that adapter is being consumed by a client who expects the object model to be in a specific native encoding. If the object model being read is not in that native encoding, the metadata reader may detect 120 which modifications 121 are needed to transform the foreign encoding into the native encoding 126. It will then instantiate an adapter to modify the metadata as the client reads it, in order to allow the client to transparently read metadata in a variety of foreign encodings 117. Other metadata readers only allow reading in one specific format, rather than allowing the translation between two formats dynamically.

As clients of the metadata reader 115 use the reader to understand the object model, the metadata adapter may transparently make many classes of modifications to the non-native metadata in order to allow the native client to understand it directly. This includes modifying types referenced by the foreign type system to be types used by the native type system, and modification of metadata flags to equivalent flags in the native system.

The object model description 116 may be encoded to provide efficient translation, with minimal runtime processing time and minimal space requirements. Embodiments included herein describe such an encoding, which allows the foreign type system to be translated in-place into the native type system of the metadata reader. In this encoding, references to types in use by the object model are done via a type reference. In some cases, other metadata encodings may make use of a combination of type reference and type definition tokens based on the relative location of the token and the definition (e.g., if they are both in the same metadata file, a type definition token is chosen, while if they are in different metadata files, a type reference token is chosen). In embodiments herein, even when a type definition token is available, because the token is in the same metadata file as the definition, the type reference token is used. Using the type reference token instead of the type definition token allows systems herein to efficiently redirect types in ways that would be expensive if they were referenced through type definition tokens rather than type reference tokens.

When types used by a non-native object model are encoded using a type reference, the adapter 125 translates between type systems by translating the target of a type reference in place, while leaving the other uses of that reference unmodified in the metadata. This allows retargeting of every use of a foreign type to a native type without requiring a full scan and update of the metadata tables.

Additionally, most of the types described in a metadata container have a single view that can be shared between many different consumers, or only need minimal adaption as described above. However, there is also a class of types that may use different views for each customer. Other implementations typically have multiple separate copies of the entire metadata file (one complete copy per view), or would have attempted to adapt or rewrite the metadata on the fly depending on the consumer. The multiple copy solution increases complexity because it forces metadata deployers to manage two separate files and may hurt performance because there are needless copies of the types that have a shared representation for both consumers. Adapting or rewriting on the fly only works well for very simple transformations, and any significant transformation will significantly slow down the reading and may even require an entire new copy of the metadata may be generated temporarily in memory or on disk.

Embodiments described herein include a single metadata container that holds single definitions of the metadata for types whose view should be the same with all consumers. The metadata container also holds multiple copies of the types whose view is (or needs to be) different. The metadata reader then provides a different view of the container to each consumer and only shows that consumer the generic views for the types that have them and the consumer specific view for the rest. These concepts will be explained further below with regard to methods 200 and 300 of FIGS. 2 and 3, respectively.

Figure 2:
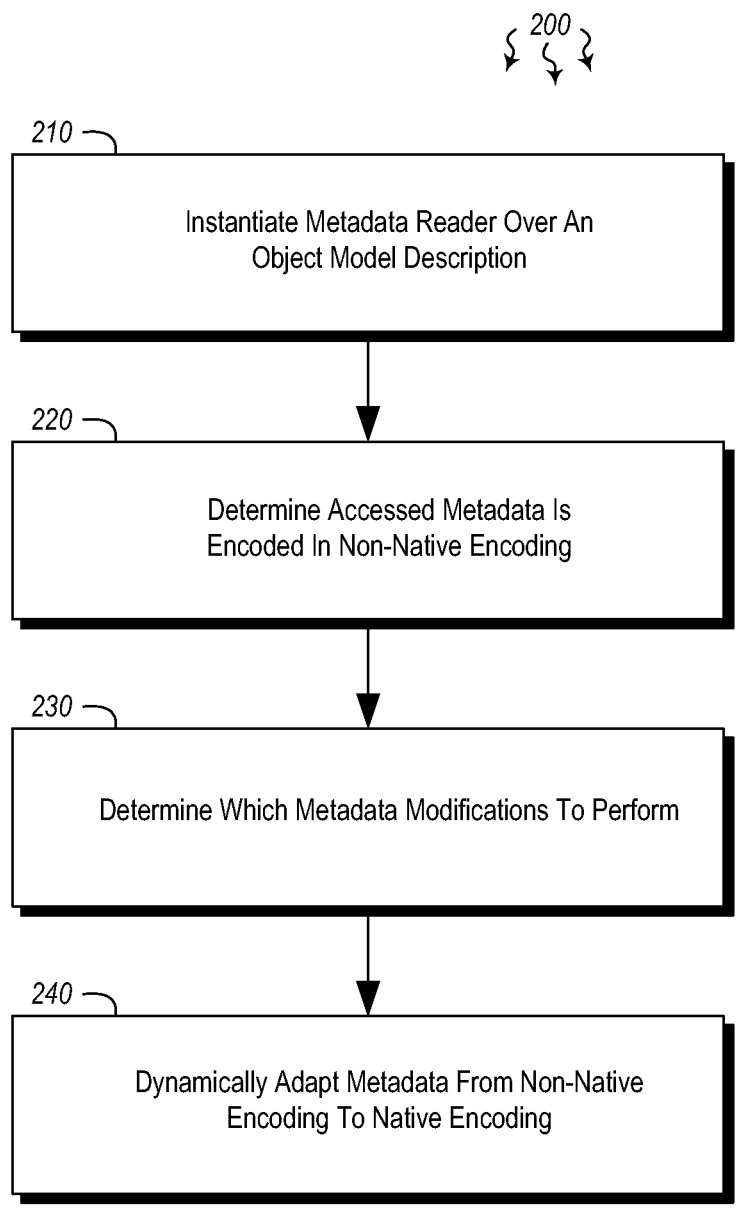
FIG. 2 illustrates a flowchart of an example method for dynamically adapting metadata for use with a native data encoding.
Figure 3:
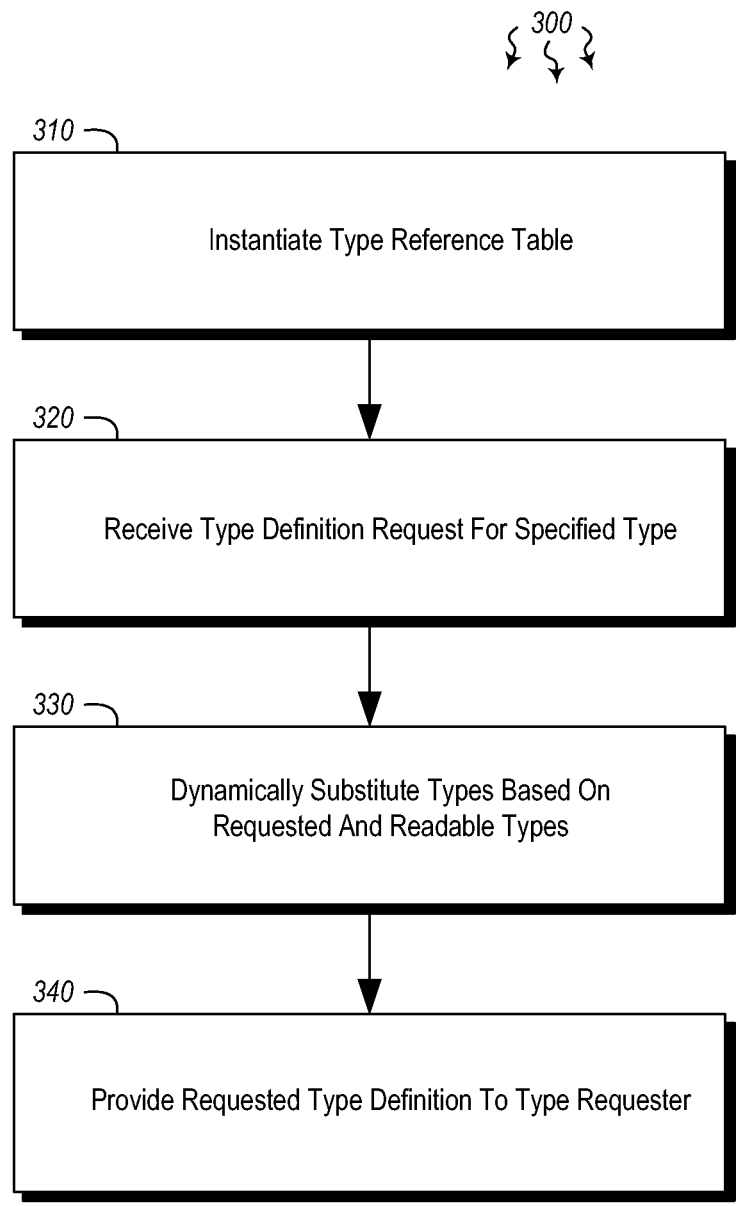
FIG. 3 illustrates a flowchart of an example method for efficiently modifying object model type references.
Figure 4:
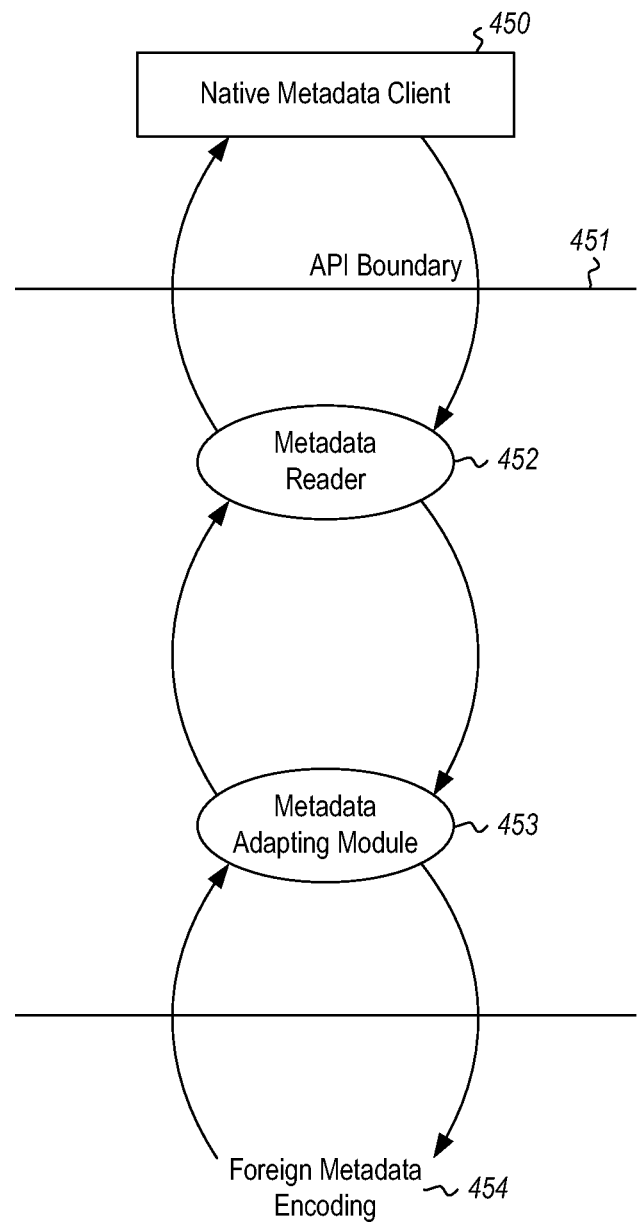
FIG. 4 illustrates an embodiment in which foreign metadata is converted to native metadata.

In view of the systems and architectures described above, methodologies that may be implemented in accordance with the disclosed subject matter will be better appreciated with reference to the flow charts of FIGS. 2 and 3. For purposes of simplicity of explanation, the methodologies are shown and described as a series of blocks. However, it should be understood and appreciated that the claimed subject matter is not limited by the order of the blocks, as some blocks may occur in different orders and/or concurrently with other blocks from what is depicted and described herein. Moreover, not all illustrated blocks may be required to implement the methodologies described hereinafter.

FIG. 2 illustrates a flowchart of a method 200 for dynamically adapting metadata for use with a native data encoding. The method 200 will now be described with frequent reference to the components and data of environment 100.

Method 200 includes an act of instantiating a metadata reader over an object model description to access one or more portions of metadata in the object model description, the metadata reader being configured to read native metadata, the native metadata comprising metadata represented in an encoding that is expected by the metadata reader (act 210). For example, instantiating module 110 may instantiate metadata reader 115 over object model description 116. The metadata reader may be instantiated to access portions of metadata in the object model description. The metadata may be of a native type (126) or a foreign, non-native type (117). The metadata reader is configured to read metadata encoded in the native format, but may not be able to read metadata encoded in any of a variety of different non-native formats. The metadata reader thus determines that the accessed metadata is encoded in a non-native encoding (act 220) and further determines which metadata modifications are to be performed to transform the non-native encoding into a native encoding (act 230).

The modifications may include modifying (or re-encoding) types referenced by the non-native encoding to be types used by the native encoding. The modifications may also include modifying metadata flags of the non-native encoding to metadata flags of the native encoding. As such, after the modification, the metadata reader will be able to recognize the metadata flags. Other modifications may also be performed, separately or in addition to those mentioned above. In some cases, data types may be re-written to comply with the native encoding. These data types may be dynamically re-written to make them readable or otherwise accessible to the metadata reader.

Method 200 also includes an act of dynamically adapting the metadata of the object model from a non-native encoding to a native encoding according to the determined modifications, such that the object model is readable by a native runtime (act 240). For example, adapting module 125 may dynamically adapt non-native metadata 117 to a native encoding 126 using the determined modifications 121 determined by module 120. After the modifications have been applied, the object model 116 is then readable by a native runtime. The dynamic adaptations thus allow a user to read metadata in a plurality of different non-native encodings. Regardless of which non-native encoding the metadata is encoded in, the system described will adapt the metadata to a native encoding which is readable by the metadata reader using one or more different modifications.

In some embodiments, the dynamic adaptation may occur at a metadata importing-reading level. By adapting the metadata at an importing-reading level, subsequent adaptations at runtime may be prevented. In some cases, a visibility modifier may be applied to make the dynamically adapted metadata internally or publicly visible. This visibility modifier may be changed in the metedata by the developer 105 as desired.

FIG. 3 illustrates a flowchart of a method 300 for efficiently modifying object model type references. The method 300 will now be described with frequent reference to the components and data of environment 100.

Method 300 includes an act of instantiating a type reference table configured to receive type definition requests and provide appropriate type definitions in response using one or more type reference tokens stored in metadata readable by a metadata reader (act 310). For example, instantiating module 110 may instantiate type reference table 130 which receives type definition requests and provides type definitions 131 in response using various type reference tokens stored in metadata 117. The type reference table 130 includes metadata readable by metadata reader 115. The instantiated type reference table receives a type definition request for a specified type from a type requester (act 320). Thereafter, type reference tokens are implemented in the metadata of the type reference table 130 to dynamically substitute one or more types for the metadata reader 115 based on which type was requested and which type is readable by the metadata reader (act 330). Accordingly, types are dynamically substituted as requested and as needed using the type reference table. Non-native type references are substituted for native type references in place. These dynamic substitutions provide a standardized view of non-native types to the metadata reader.

Method 300 also includes an act of providing the requested type definition to the type requester based on the dynamically substituted types provided by the type reference tokens in the metadata (act 340). Thus, type reference table 130 may provide type definition 131 to the type requester based on the dynamically substituted types. The type reference table may be instantiated to ensure that the type requestor's requests are received via a type reference. The types are substituted in the type reference table. In this manner, user requests remain unchanged while native type definitions are used in place of the non-native definition.

Both native and non-native encodings of the metadata may be created in the same metadata file. Thus, the same metadata file may include more than one encoding. In cases where a single metadata file has multiple encodings, the metadata reader may determine which user is requesting the metadata file and, based on the determination, may pass the appropriate encoding of the metadata file to the user. Accordingly, if the user requested a native encoding, the native view or native encoding will be sent to the user. In this manner, the encodings are complete and consistent for each user. In order to provide efficient execution, only those metadata files that are accessed by different types of users are encoded in both a native and a non-native encoding. As mentioned above, the dynamic adapting may include various different methods of modifications including modifying types referenced by the non-native encoding to be types used by the native encoding and modifying metadata flags of the non-native encoding to metadata flags of the native encoding. Thus, various types of non-native metadata may be dynamically adapted for use with a native data encoding.

Additional embodiments are described in FIGS. 4-9. For example, in FIG. 4, Interaction between a native client, a metadata reader, an adapter, and a foreign object model is depicted. Metadata that is received in a foreign encoding (454) may be sent to metadata adapting module 453 to be adapted into a native encoding readable by the metadata reader 452. The native metadata client 450 (on the other side of API boundary 451) may interact with the metadata reader (e.g. using an API) to access the natively encoded metadata.

Figure 5:
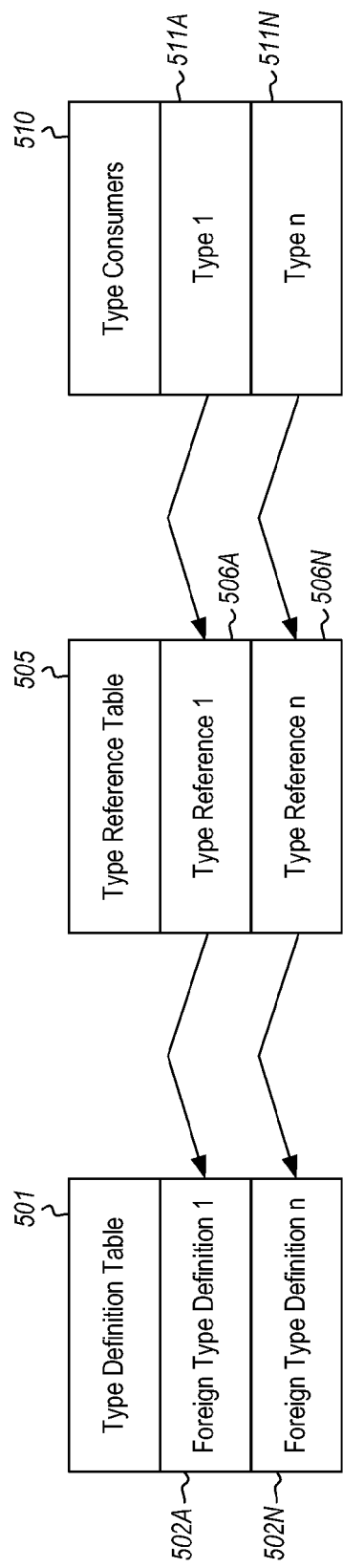
FIG. 5 illustrates an embodiment in which metadata is encoded using type references.

FIG. 5 illustrates a metadata encoding using type references when using multiple types. For instance, type consumers 510 may include type 1 (511A) and one or more other types (type n (511N)). These types may be linked to a foreign type definition (e.g. 502A) via a type reference (506A). Thus, type 1 (511A) may be linked to foreign type definition 1 (502A) via type reference 506A. Similarly, other types (type n) may be linked to foreign type definitions 502N via type references 506N. The foreign type definitions are stored in a type definition table 501, while the type references are stored in a type reference table 505.

Figure 6:
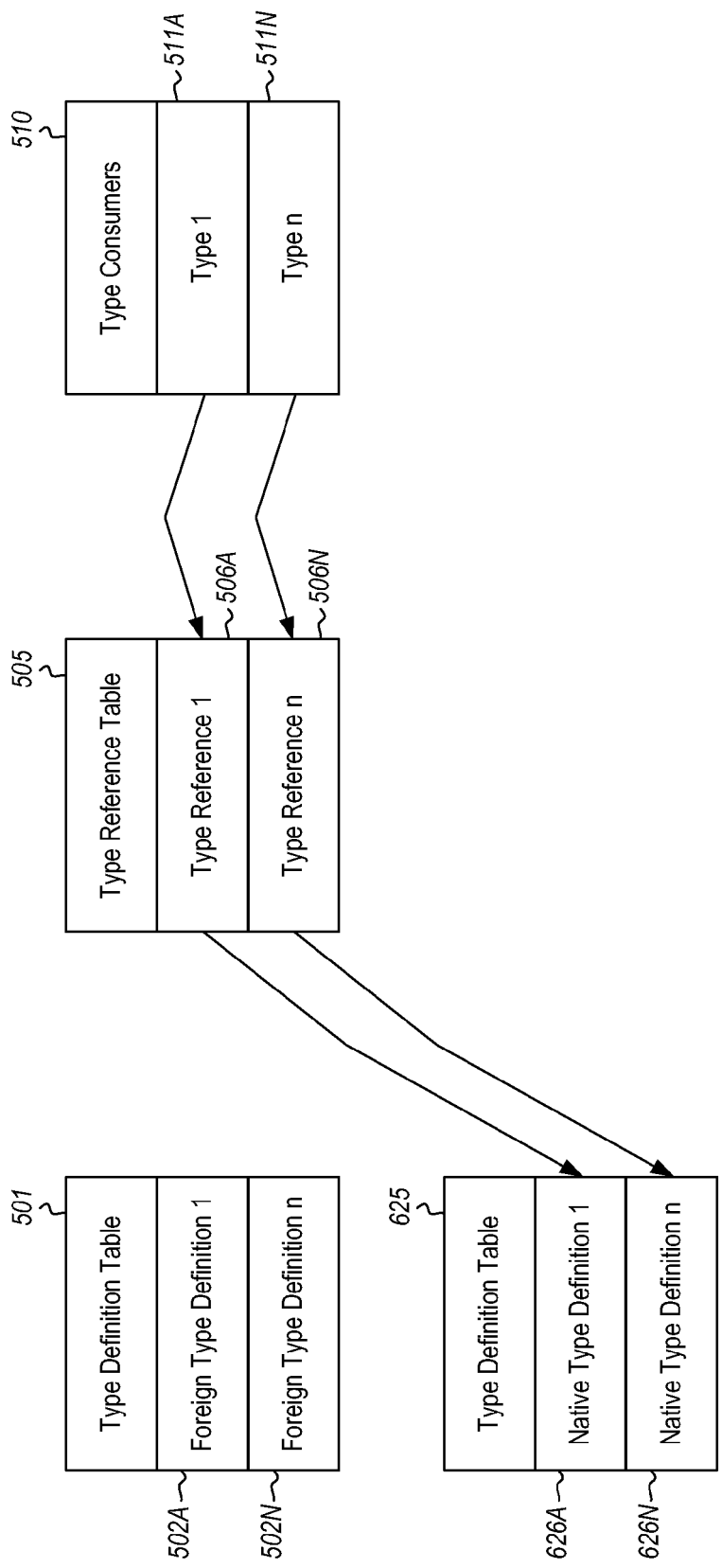
FIG. 6 illustrates an embodiment in which a foreign type system is converted to a native type system via in-place modification of type references.

FIG. 6 illustrates the conversion of foreign type system to native one via in-place modification of type references. Accordingly, while the type references 506A and 506N previously pointed to foreign type definitions 502A and 502N (in FIG. 5), the type references may be modified to point to different, native type definitions. Thus, type reference 506A may be modified to point to native type definition 626A, and type reference 506N may be modified to point to native type definition 626N. As such, a foreign type system may be converted to a native type system.

Figure 7:
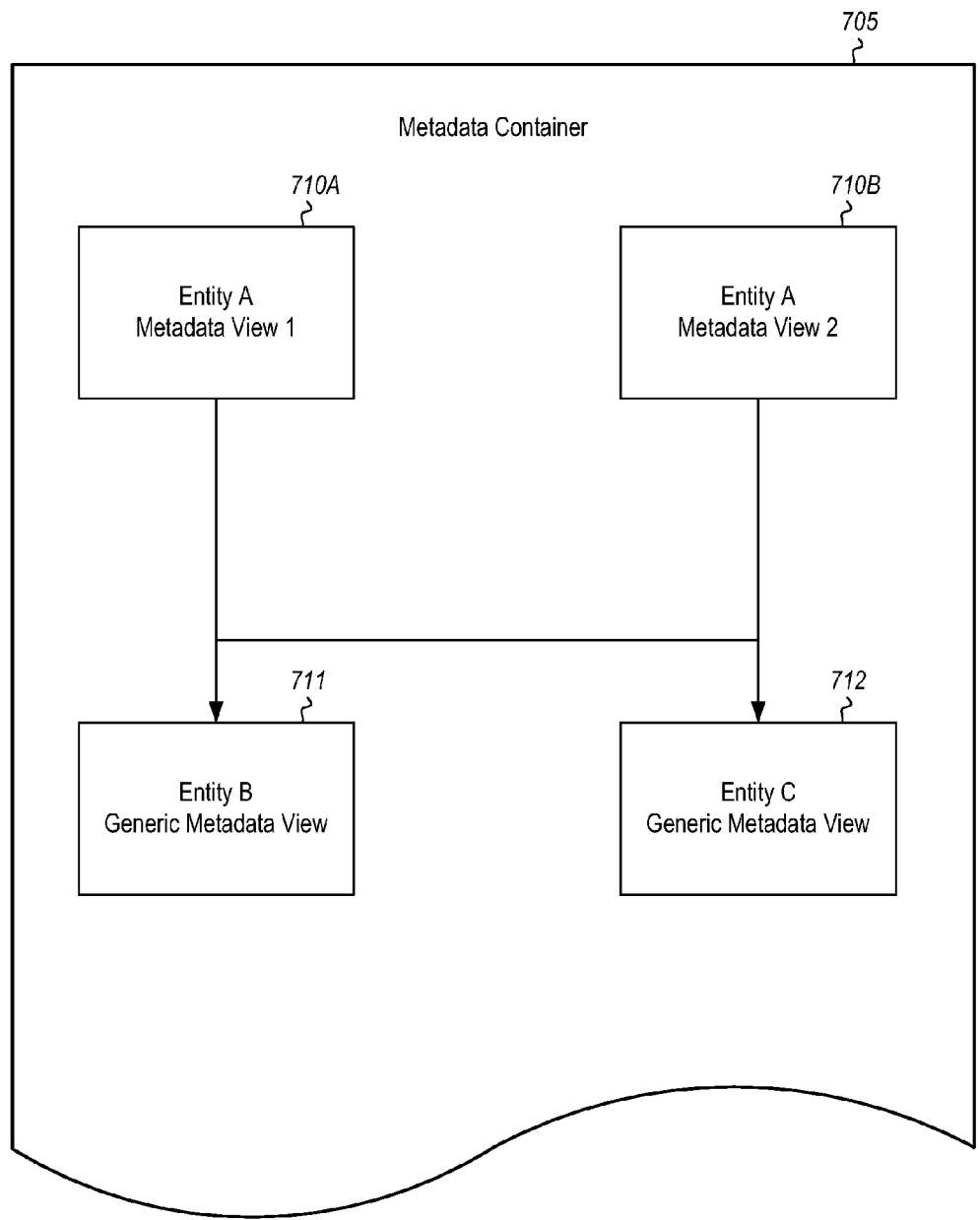
FIG. 7 illustrates an embodiment of a metadata container.
Figure 8:
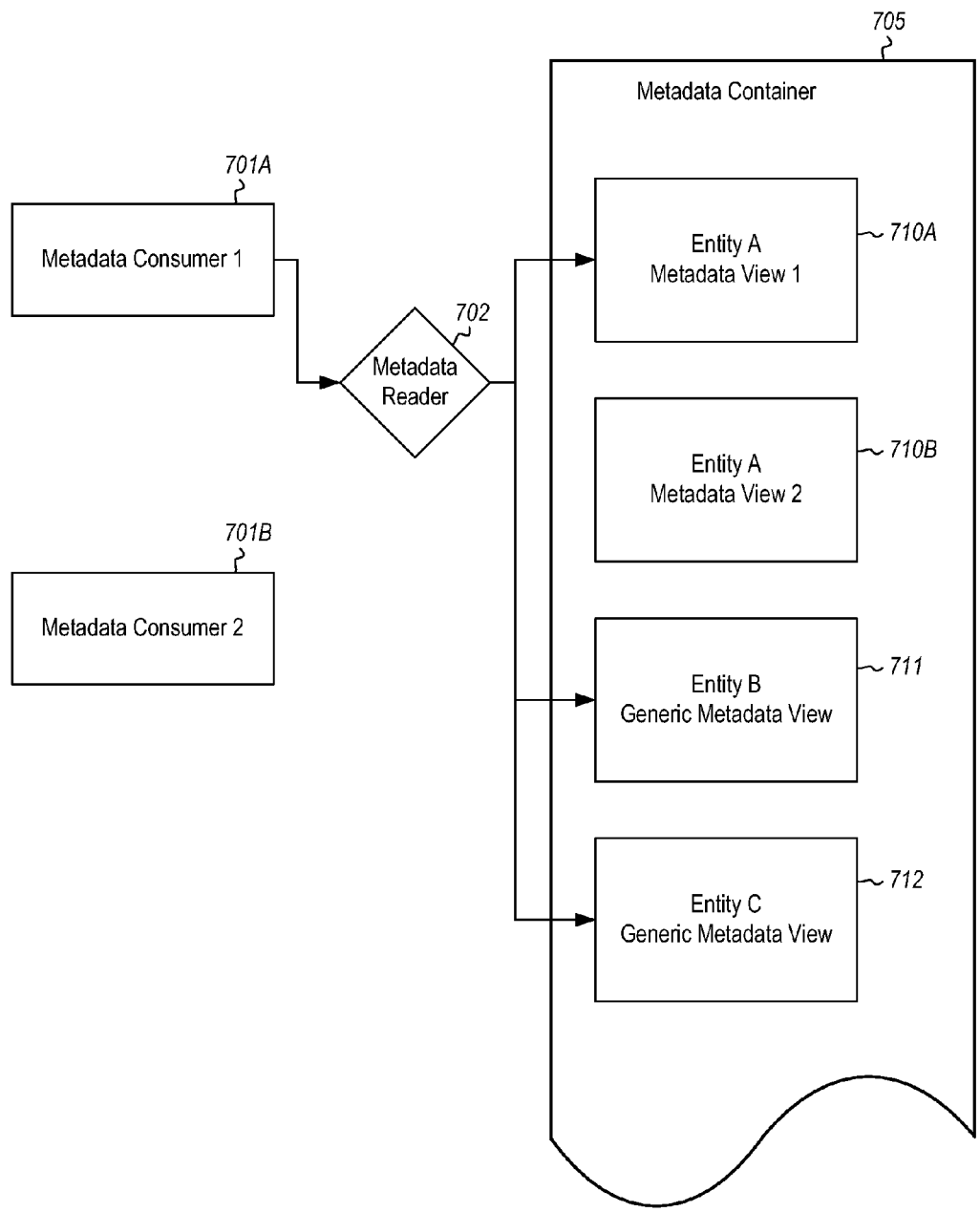
FIG. 8 illustrates an embodiment in which a view of a metadata container is provided.
Figure 9:
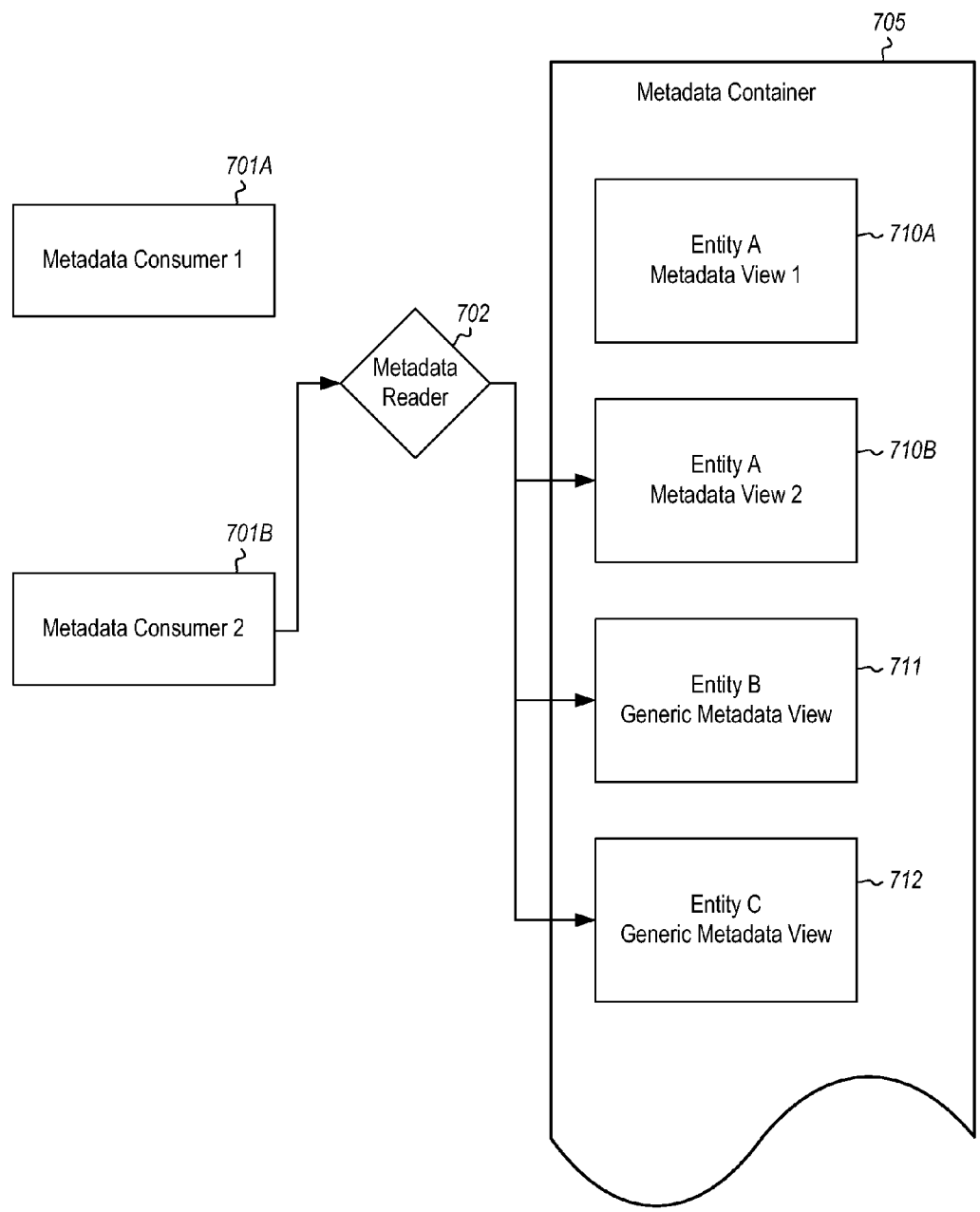
FIG. 9 illustrates an alternative embodiment in which a view of a metadata container is provided

FIG. 7 illustrates that within a metadata container, each entity that requires multiple metadata views may have a separate copy of a view. These copies then reference a shared view for entities that do not need different views. Accordingly, entity A in metadata container 705 may have two different views: a first view 710A and a second view 710B. And, whereas entity A has two views, entities B and C each have their own generic metadata views (711 and 712, respectively). FIG. 8 further shows that a metadata reader can automatically give a first metadata consumer 701A a view of the entities in the metadata container 705 that is consistent with its desired view. Accordingly, because consumer 701A prefers metadata view 710A, the metadata reader 702 shows entity A with view 710A, and shows entities B and C (711 and 712) with generic views. FIG. 9 shows that metadata reader 702 automatically gives metadata consumer 710B a view of the entities in the metadata container that is consistent with its desired view. Accordingly, because consumer 701 B prefers metadata view 701 B, the metadata reader 702 shows entity A with view 710B, and shows entities B and C (711 and 712) with generic views.

Accordingly, methods, systems and computer program products are provided which dynamically adapt metadata for use with a native data encoding. Moreover, methods, systems and computer program products are provided which efficiently modify object model type references.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

We claim:

1. At a computer system including at least one processor and a memory, in a computer networking environment including a plurality of computing systems, a computer-implemented method for efficiently modifying object model type references, the method comprising:
    an act of instantiating a type reference table configured to receive type definition requests and provide appropriate type definitions in response using one or more type reference tokens stored in a metadata file readable by a metadata reader, the metadata file including native and non-native encodings of the same metadata within the metadata file;
    an act of the instantiated type reference table receiving a type definition request for a specified type from a type requester;
    an act of implementing type reference tokens in the metadata of the type reference table to dynamically substitute one or more types for the metadata reader based on which type was requested and which type is appropriate for the current consumer of the metadata reader; and
    an act of providing the requested type definition to the type requester based on the dynamically substituted types provided by the type reference tokens in the metadata.

2. The method of claim 1, wherein non-native type references are substituted for native type references in place.

3. The method of claim 1, wherein the dynamic substitution provides a standardized view of non-native types to the metadata reader.

4. The method of claim 1, wherein the type reference table is instantiated to ensure that the type requestor's requests are received via a type reference.

5. The method of claim 1, wherein types are substituted in the type reference table, such that user requests remain unchanged while native type definitions are used in place of non-native definition.

6. A computer system comprising the following:
    one or more processors;
    system memory;
    one or more computer-readable storage media having stored thereon computer-executable instructions that, when executed by the one or more processors, causes the computing system to perform a method for dynamically adapting metadata for use with a native data encoding, the method comprising the following:
        an act of instantiating a metadata reader over an object model description to access one or more portions of metadata in the object model description, the metadata reader being configured to read native metadata, the native metadata comprising metadata represented in an encoding that is expected by the metadata reader;
        an act of the metadata reader determining that the accessed metadata is encoded in a non-native encoding;
        an act of the metadata reader determining which metadata modifications are to be performed to transform the non-native encoding into a native encoding;
        an act of dynamically adapting the metadata of the object model from a non-native encoding to a native encoding according to the determined modifications, such that the object model is readable by a native runtime, wherein a single metadata file includes both the native and non-native encodings of the same metadata;
        an act of the metadata reader determining which user is requesting the metadata file; and
        based on the determination, an act of passing the appropriate encoding of the metadata file to the user.

7. A computer system comprising the following:
    one or more processors;
    system memory;
    one or more computer-readable storage media having stored thereon computer-executable instructions that, when executed by the one or more processors, causes the computing system to perform a method for efficiently modifying object model type references, the method comprising the following:
        an act of instantiating a type reference table configured to receive type definition requests and provide appropriate type definitions in response using one or more type reference tokens stored in a metadata file readable by a metadata reader, the metadata file including native and non-native encodings of the same metadata within the metadata file;
        an act of the instantiated type reference table receiving a type definition request for a specified type from a type requester;

an act of implementing type reference tokens in the metadata of the type reference table to dynamically substitute one or more types for the metadata reader based on which type was requested and which type is appropriate for the current consumer of the metadata reader; and an act of providing the requested type definition to the type requester based on the dynamically substituted types provided by the type reference tokens in the metadata.

8. The system of claim 7, wherein non-native type references are substituted for native type references in place.

9. The system of claim 7, wherein the dynamic substitution provides a standardized view of non-native types to the metadata reader.

10. The system of claim 7, wherein the type reference table is instantiated to ensure that the type requestor's requests are received via a type reference.

11. The system of claim 7, wherein types are substituted in the type reference table, such that user requests remain unchanged while native type definitions are used in place of non-native definition.

* * * * *